UNITED STATES PATENT OFFICE.

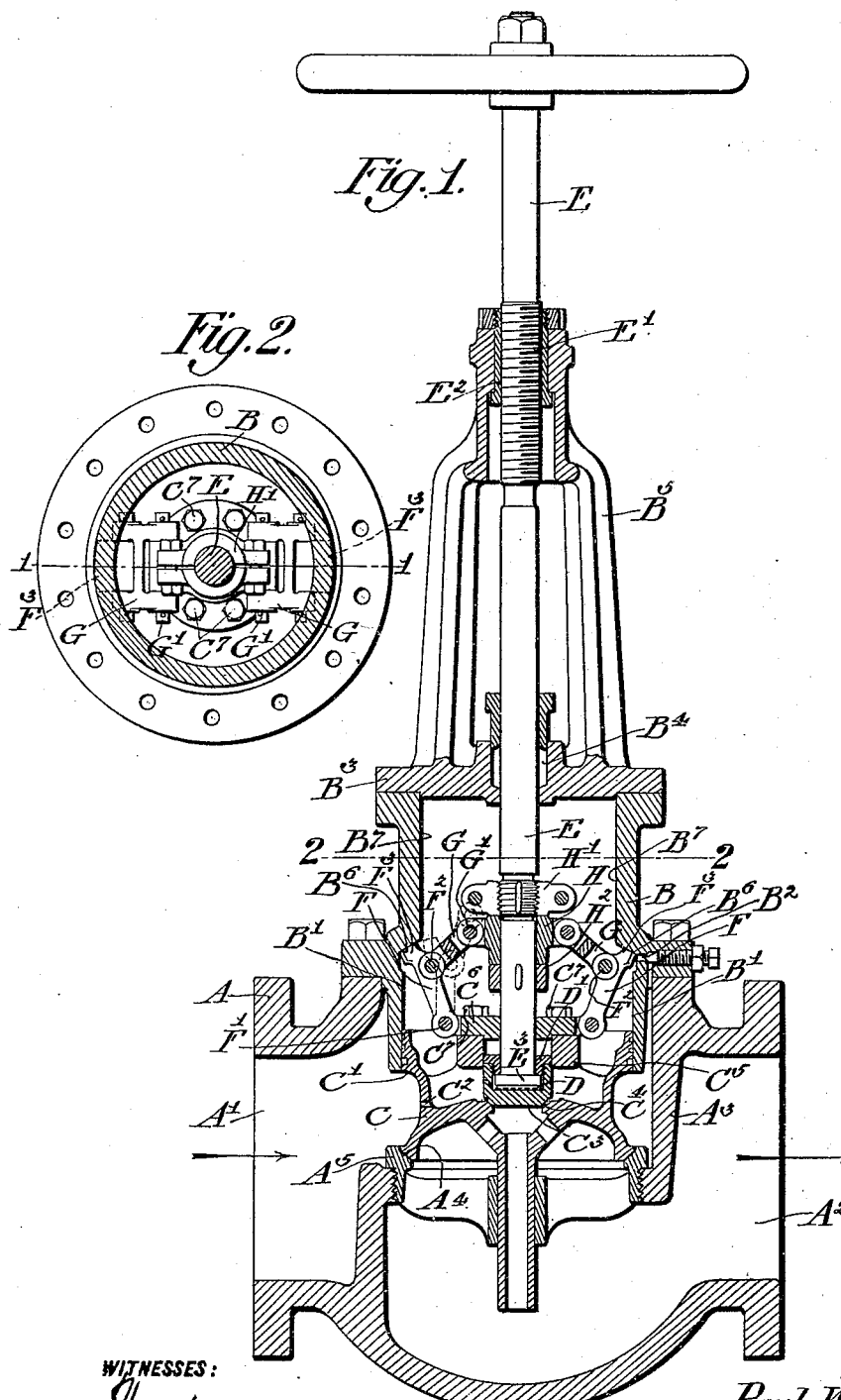

PAUL W. KNAUF, OF PHILADELPHIA, PENNSYLVANIA, ASSIGNOR TO SCHUTTE AND KOERTING COMPANY, OF PHILADELPHIA, PENNSYLVANIA, A CORPORATION OF PENNSYLVANIA.

VALVE.

938,491.  Specification of Letters Patent.  Patented Nov. 2, 1909.

Application filed September 21, 1907. Serial No. 393,901.

*To all whom it may concern:*

Be it known that I, PAUL W. KNAUF, a citizen of the United States of America, residing in the city and county of Philadelphia, in the State of Pennsylvania, have invented a certain new and useful Improvement in Valves, of which the following is a true and exact description, reference being had to the accompanying drawings, which form a part thereof.

The present invention relates to valves for the control of fluid such as steam and water, and particularly to that type of valve in which on account of its size or for other reasons the main valve is provided with a pilot valve controlled passage extending through it by which the inlet and outlet sides of the valve casing may be connected while the main valve is on its seat, thus facilitating the operation of the valve. In valve constructions of this kind it is desirable that in opening, the pilot valve should open fully before the main valve moves off its seat, and that in closing, the main valve should be seated before the pilot valve is seated. Furthermore, the pilot and main valves should be so controlled that neither is permitted to hammer on its seat by reasons of variations in the pressure or flow of the fluid controlled, at the same time each valve should preferably be so connected to the operating means that it can seat itself properly.

The object of the present invention is the provision of simple and effective connections between the main and pilot valves and a single operating device or stem by which the main and pilot valves are both operated in the desirable manner above described.

The various features of novelty which characterize my invention are pointed out with particularity in the claims annexed to and forming a part of this specification. For a better understanding of my invention, however, reference may be had to the accompanying drawings and descriptive matter in which I have illustrated and described forms in which my invention may be embodied.

In the drawings, Figure 1 is a sectional elevation taken on the line 1—1 of Fig. 2. Fig. 2 is a sectional elevation taken on the line 2—2 of Fig. 1.

In the drawings, referring first to the construction shown in Figs. 1 and 2, A represents the valve casing provided with inlet chamber $A'$ and outlet chamber $A^2$, these chambers being separated by the diaphragm $A^3$ having in it the valve seated port $A^4$. Preferably, a removable valve seat member $A^5$ is employed as shown. The valve casing bonnet B is detachably secured to the valve casing. In the form shown, the bonnet is provided with a cylinder $B'$, which extends into the inlet chamber, and the main valve C, which seats on the valve seat member $A^5$ and controls the port $A^4$, is provided with a hollow piston extension $C'$ which is received in the cylinder $B'$. The interiors of the cylinder $B'$ and of the hollow piston $C'$ have restricted communication with the inlet chamber of the valve casing proper through the port $C^2$ of the hollow piston and port $B^2$ in the wall of the cylinder $B'$. The valve C has a pilot valve seated port $C^3$ which leads through the valve and connects the outlet passage $A^2$ with the interior of the hollow piston $C'$. The port $C^3$ is controlled by the pilot valve D adapted to seat itself on the seat $C^4$ formed on the main valve C.

The stem E, by which the main and pilot valves are operated, passes through a suitable stuffing box $B^4$ formed in the cover member $B^3$ which closes the upper end of the bonnet B. The upper end of the valve stem E, in the form shown in Figs. 1 and 2, is threaded, the threaded portion $E'$ passing through a nut $E^2$ secured in the yoke $B^5$ carried by the cover member. The lower end of the valve stem has a collar $E^3$ which is swiveled in the hollow upper end of the pilot valve D, the pilot valve and stem being connected together by the externally threaded collar $D'$ screwed into the upper end of the hollow portion of the valve D. The body of the pilot valve D is guided by a collar or boss $C^5$ carried by the main valve. A plate $C^6$, detachably connected to the upper end of the boss $C^5$ by the bolt $C^7$, may be arranged to engage the collar $D'$ and limit the movement of the pilot valve D away from its seat $C^4$.

Two or more arms F are pivotally connected to the main valve as by means of pintles $F'$ journaled in ears carried by the plate $C^6$. The arms or links F are pivotally connected at $F^2$ to arms or links G, which in turn are pivotally connected at $G'$ to a collar or crosshead H swiveled on the stem E and held against axial movement thereon by the upper and lower collars H' and H². The arms F have extensions F³. When the main valve is seated and the arms F and G buckle as the pilot valve is moved toward or away from its seat, the extensions F³ engage the casing guide surface B⁶. When the main and pilot valves are both off their seats, the extensions F³ engage the casing guide surface B⁷. The casing guide surface B⁷ is cylindrical and forms the inner wall of the body of the bonnet B, and the guide surface B⁶ is in the form of a zone beneath the lower end of the cylindrical surface B⁷.

In operation, assuming the valve to be closed, the pilot valve is first opened by moving the valve stem E upward. This, of course, may be done by the nut and screw arrangement as shown or by any other of the well known means employed for moving valve stems. Until the pilot valve is entirely open the main valve is anchored on its seat by the arms F which form struts extending between the curved surface B⁶ of the bonnet B and the main valve. The parts are so proportioned that when the upward movement of the stem is continued until the pilot valve engages the plate C⁶, when of course the main valve must move up with the pilot valve, the extensions F³ are moved out of engagement with the casing guide surface B⁶, and into position to engage the casing guide surface B⁷, and on further upward movement of the stem the parts F³ engage the guide surface B⁷. While the extensions F³ engage the casing guide surface B⁷, buckling of the arms or links F and G is of course prevented and the valves D and C are maintained at their maximum distance apart. In closing, the reverse operations occur, the pilot valve beginning its relative movement of approach toward its seat C⁴ only after the main valve has seated itself. In Fig. 1 the left hand arms F and G are shown in dotted lines in the position corresponding to the closed position of the main valve and the wide open position of the pilot valve.

With the construction described, it willl be observed that both the pilot and main valves are movably connected to the stem so that each is free to rotate independently of the stem and the other valve, if necessary, to permit the valve to seat itself properly, while at the same time the valves are not positively rotated on their seats in opening or closing. While the main valve is off its seat, the arms F and G form means positively holding the two valves apart, but during the opening or closing movement of the pilot valve the main valve is in effect disconnected from the pilot valve, and is positively anchored against its seat by the arms F extending between it and the casing guide surface B⁶.

It will be understood that when the main valve is on its seat and the pilot valve is off its seat the interiors of the cylinder B' and hollow piston C' are in communication with the outlet side of the valve casing, and, as the flow of fluid into the cylinder and hollow piston through the passages C² and B² is restricted, the main valve C becomes practically balanced, where the piston C' is of substantially the same cross sectional area as the body of the main valve. At all times hammering of either valve on its seat is prevented by the connections described.

Having now described my invention, what I claim as new and desire to secure by Letters Patent is:

1. In combination, a valve casing having a valve seated port, a main valve for said port having a passage extending through it, a pilot valve controlling the passage through the main valve, a stem to which the pilot valve is directly connected, a collar carried by the stem and free to rotate thereon but held against longitudinal movement with respect thereto, hinged links connecting the said collar and main valve, said valve casing being provided with a cylindrical curved guide surface, arranged to engage said links and hold them against buckling when the main valve is off its seat, and with a zonoidal guide surface engaging said links to thereby hold the main valve on its seat except when the pilot valve is wide open.

2. In combination, a valve casing having a valve seated port, a main valve for said port having a passage extending through it, a pilot valve controlling the passage through the main valve, a stem connected to the pilot valve, a collar carried by the stem and free to rotate thereon, but held against longitudinal movement with respect thereto, arms pivoted to the main valve, and other arms pivoted to the first mentioned arms and to said collar, said casing having a zonoidal curved guide surface, and the arms connected to the main valve having a surface which engages said zonoidal surface when the main valve is seated and when the arms buckle as the pilot valve in closing or opening its port approaches or recedes from the main valve, whereby the main valve is anchored against movement off its seat except when the pilot valve is wide open, said casing having other cylindrical guide surface engaging said arms to hold them against buckling when the main valve is moved off its seat.

PAUL W. KNAUF.

Witnesses:
 ARNOLD KATZ,
 D. STEWART.